United States Patent Office 3,128,225
Patented Apr. 7, 1964

3,128,225
DIPHENYLMETHYL ESTERS OF O,O-DIALKYL MONOTHIO- AND DITHIOPHOSPHORIC ACIDS AND PESTICIDAL METHODS USING SAME
Llewellyn W. Fancher, Lafayette, and Stephen C. Dorman, Los Gatos, Calif., assignors to Stauffer Chemical Company, a corporation of Delaware
No Drawing. Filed Jan. 20, 1960, Ser. No. 3,513
18 Claims. (Cl. 167—30)

This invention relates in general to certain new compositions of matter, methods for making them, and the use thereof as insecticides and pesticides.

This class of compounds may be represented by the formula:

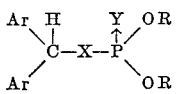

where Ar is phenyl or chlorophenyl, X is oxygen or sulfur, Y is oxygen or sulfur and R is methyl or ethyl.

These compounds are prepared by two general methods:

(A) When X is sulfur and Y is sulfur or oxygen:

where
  A is chlorine or bromine
  M is a salt forming metal or $NH_4^+$ (B) When X is oxygen and Y is sulfur:

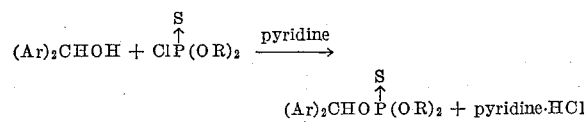

Examples illustrating the preparation of the compounds of the present invention appear below; code numbers have been assigned each compound for convenience in referring to the various compounds hereinafter.

*Example 1.—Bis(p-Chlorophenyl)Methyl-O,O-Diethyl Phosphorodithioate (R–100—Method A)*

A mixture of 54.0 grams (0.17 M) of bis(p-chlorophenyl)-bromomethane, 51.0 grams (0.25 M) of ammonium-diethyldithiophosphate and 150 milliliters of methyl ethyl ketone was stirred and refluxed for three and one-half hours. The solvent was removed on a steam bath and the residue dissolved in benzene and washed three times with saturated aqueous sodium chloride, followed by one wash with dilute aqueous sodium hydroxide and again with saturated aqueous sodium chloride. The benzene solution was dried over anhydrous magnesium sulfate, filtered and the filtrate concentrated on the steam bath and stripped with an air jet. By this means there was obtained 48.4 grams (68% of theory) of a thick viscous liquid.

|  | Estimated | Found |
|---|---|---|
| Percent phosphorus | 7.35 | 7.64 |
| Percent chlorine | 16.88 | 15.91 |

*Example 2.—Bis(p-Chlorophenyl)Methyl-O,O-Dimethyl Phosphorodithioate (R–101—Method A)*

In essentially the same manner as for Example 1, a mixture of 67.0 grams (0.21 M) of bis(p-chlorophenyl)-bromomethane, 52.5 grams (0.3 M) of ammonium-dimethyldithiophosphate and 150 milliliters of methyl ethyl ketone gave 40.7 grams (49% of theory) of the viscous dimethyl derivative.

|  | Estimated | Found |
|---|---|---|
| Percent phosphorus | 7.88 | 7.02 |
| Percent chlorine | 18.07 | 18.31 |

*Example 3.—Bis(p-Chlorophenyl)Methyl-O,O-Diethyl-thionophosphate (R–102—Method B)*

Thirteen grams (0.05 M) of 4,4-dichlorobenzohydrol was mixed with 9.6 grams (0.051 M) of O,O-diethylthiophosphoryl chloride, followed by 4.7 grams (0.06 M) of pyridine added at once. (No apparent heat evolution.) The mixture was stirred and maintained at 48–50° C. (by means of a heating mantle) for six hours. The product was cooled and dissolved in 75 milliliters of chloroform, then washed once with water, once with dilute hydrochloric acid and twice again with water. The product was dried over anhydrous magnesium sulfate, filtered, and the chloroform removed on the steam bath with an air jet. By this means there was obtained a viscous liquid weighing 17.0 grams (84% of theory).

|  | Estimated | Found |
|---|---|---|
| Percent phosphorus | 7.65 | 7.06 |
| Percent chlorine | 17.52 | 17.92 |

The following are typical of the compounds which may be prepared following the procedures set out above:

| "R" No. | Ar | X | Y | R | $n_D^{30}$ |
|---|---|---|---|---|---|
| 100 | Cl—$C_6H_4$— | S | S | $C_2H_5$ | 1.5884 |
| 101 | Cl—$C_6H_4$— | S | S | $CH_3$ | 1.6213 |
| 102 | Cl—$C_6H_4$— | O | S | $C_2H_5$ | 1.5895 |
| 103 | p-Cl—$C_6H_4$ | S | O | $C_2H_5$ | 1.5760 |
| 104 | $C_6H_5$— | S | S | $CH_3$ | 1.5920 |
| 105 | $C_6H_5$— | S | S | $C_2H_5$ | 1.5840 |
| 106 | $C_6H_5$— | S | O | $C_2H_5$ | 1.5410 |
| 107 | $C_6H_5$— | O | S | $C_2H_5$ | 1.5813 |
| 108 | p-Cl—$C_6H_4$—$C_6H_5$— | S | S | $C_2H_5$ | 1.5922 |
| 109 | p-Cl—$C_6H_4$—$C_6H_5$— | S | S | $CH_3$ | 1.5997 |

The compounds listed above may also be identified as follows:

R–103—S-bis(4-chlorophenyl)methyl-O,O-diethylphosphorothioate
R–104—O,O-dimethyldithiophosphoryl diphenylmethane
R–105—O,O-diethyldithiophosphoryl diphenylmethane
R–106—O,O-diethylmonothiophosphoryl diphenylmethane
R–107—O,O-diethylthionophosphoryl diphenylmethane
R–108—O,O-diethyldithiophosphoryl-4-chlorophenyl phenylmethane
R–109—O,O-dimethyldithiophosphoryl-4-chlorophenyl phenylmethane In a series of tests, small screen cages containing female house flies (*M. domestica*) were sprayed with the active compounds at a concentration of 0.5% and all exhibited insecticidal activity. Further tests utilizing similar procedures but different concentrations were also conducted. A period of 24 hours was allowed to lapse after spraying and a count was made to determine living and dead insects. The following results were obtained, the concentration being given in micrograms per milliliter:

HOUSE FLY EVALUATION TEST

| Concentration | Percent Mortality | |
|---|---|---|
| | R–100 | R–101 |
| 100 | 100 | 100 |
| 75 | 96 | 96 |
| 50 | 36 | 64 |
| 25 | 8 | 4 |
| 12 | 0 | 0 |

In addition, tests using various of the other compounds, each at a concentration of 100 micrograms per milliliter, were conducted with the following result.

"R" No.: Percent mortality
- 104 ___ 64
- 105 ___ 100
- 108 ___ 88
- 109 ___ 80

When used as insecticides, the compounds of the present invention are preferably compounded in the form of a dispersion for application. However, they may be applied as a solution in a suitable solvent, such as acetone and the like, or can be mixed with inert dust and applied as a powder. One particularly advantageous manner of applying the compounds of the present invention is to compound them in the form of a wettable powder by the addition of a finely ground carrier or diluent, such as "Attaclay," a finely divided clay, containing a suitable setting agent such as "Duponal–51," a higher aliphatic alcohol sulfate wetting agent. Such powders can be readily mixed with water and applied as dispersions to infested areas.

The compounds have also been found to be effective against various other pests such as insect larvae. Results of two additional tests are set forth in the two paragraphs which follow.

Guinea pig systemic test using screw worms (*Callitroga hominivorax*): Oral administration of 50 mg. of either R–100 or R–101/kilo of guinea pig killed 100% of the screw worms artificially infested in the guinea pig.

Cattle grub tests in calves: Oral administration of R–100, by capsule, and R–101, by capsule, at a rate of 50 mg./kg. to young calves naturally infested with a population of mixed cattle grubs, *Hypoderma bovis* and *Hypoderma lineatum*, resulted in 93% control with R–100 and 99% with R–101.

The structural and functional uniqueness of these compounds lies in the fact that they combine the bis-arylmethane structure with a phosphorus moiety.

Obviously, many modifications and variations may be made without departing from the spirit and scope of this invention, and therefore only such limitations should be imposed as are indicated in the appended claims.

We claim:
1. A compound having the formula

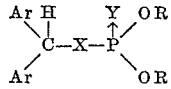

where Ar is selected from the class consisting of phenyl and chlorophenyl, where X is selected from the class consisting of oxygen and sulfur, where Y is selected from the class consisting of oxygen and sulfur with Y being sulfur when X is oxygen and where R is lower alkyl.

2. Bis-(p-chlorophenyl)methyl-O,O-diethyl phosphorodithioate.
3. Bis(p-chlorophenyl)methyl-O,O-dimethyl phosphorodithioate.
4. Bis(p-chlorophenyl)methyl - O,O - diethylthionophosphate.
5. S - bis(4 - chlorophenyl)methyl - O,O - diethylphosphorothioate.
6. O,O-dimethyldithiophosphoryl diphenylmethane.
7. O,O-diethyldithiophosphoryl diphenylmethane.
8. O,O-diethylmonothiophosphoryl diphenylmethane.
9. O,O-diethylthionophosphoryl-diphenylmethane.
10. O,O-diethyldithiophosphoryl-4-chlorophenyl phenylmethane.
11. O,O - dimethyldithiophosphoryl - 4 - chlorophenyl phenylmethane.
12. The method of killing pests comprising applying to the pest habitat a composition containing as the essential active ingredient the compound having the formula

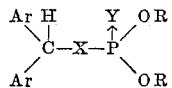

where Ar is selected from the class consisting of phenyl and chlorophenyl, where X is selected from the class consisting of oxygen and sulfur, where Y is selected from the class consisting of oxygen and sulfur with Y being sulfur when X is oxygen and where R is lower alkyl.

13. The method of killing pests comprising applying to the pest habitat a composition containing as the essential active ingredient bis(p-chlorophenyl)methyl-O,O-diethyl phosphorodithioate.

14. The method of killing pests comprising applying to the pest habitat a composition containing as the essential active ingredient bis(p-chlorophenyl)methyl-O,O-dimethyl phosphorodithioate.

15. The method of killing pests comprising applying to the pest habitat a composition containing as the essential active ingredient O,O-diethyldithiophosphoryl diphenylmethane.

16. The method of killing pests comprising applying to the pest habitat a composition containing as the essential active ingredient O,O-diethyldithiophosphoryl-4-chlorophenyl phenylmethane.

17. The method of killing pests comprising applying to the pest habitat a composition containing as the essential active ingredient O,O-dimethyldithiophosphoryl-4-chlorophenyl phenylmethane.

18. A thiophosphoric acid ester selected from the group consisting of

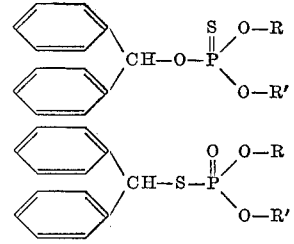

and

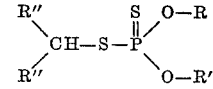

where R" is chlorophenyl and R and R' are lower alkyl.

References Cited in the file of this patent
UNITED STATES PATENTS

| | | |
|---|---|---|
| 2,266,514 | Romieux et al. | Dec. 16, 1941 |
| 2,571,989 | Schrader | Oct. 16, 1951 |
| 2,611,729 | Bartlett | Sept. 23, 1952 |
| 2,862,017 | Schrader et al. | Nov. 25, 1958 |
| 2,960,525 | Dorken et al. | Nov. 15, 1960 |